(12) United States Patent
Bourdon et al.

(10) Patent No.: US 9,094,625 B2
(45) Date of Patent: Jul. 28, 2015

(54) METHOD AND DEVICE FOR GENERATING IMAGES COMPRISING MOTION BLUR

(75) Inventors: Pascal Bourdon, Poitiers (FR); Pierrick Jouet, Cesson Sevigne Cedex (FR); Vincent Alleaume, Cesson Sevigne Cedex (FR)

(73) Assignee: Thomson Licensing, Issy les-Moulineaux (FR)

( * ) Notice: Subject to any disclaimer, the term of this patent is extended or adjusted under 35 U.S.C. 154(b) by 71 days.

(21) Appl. No.: 13/993,948

(22) PCT Filed: Dec. 9, 2011

(86) PCT No.: PCT/EP2011/072328
§ 371 (c)(1),
(2), (4) Date: Sep. 3, 2013

(87) PCT Pub. No.: WO2012/080122
PCT Pub. Date: Jun. 21, 2012

(65) Prior Publication Data
US 2014/0293094 A1    Oct. 2, 2014

(30) Foreign Application Priority Data

Dec. 14, 2010  (FR) ...................................... 10 60459

(51) Int. Cl.
*H04N 5/217*    (2011.01)
*H04N 5/357*    (2011.01)
(Continued)

(52) U.S. Cl.
CPC ................ *H04N 5/357* (2013.01); *G06T 5/002* (2013.01); *G06T 5/003* (2013.01); *H04N 5/262* (2013.01); *G06T 2207/20201* (2013.01)

(58) Field of Classification Search
USPC .......... 348/231.2, 231.3, 231.6, 241; 382/255
See application file for complete search history.

(56) References Cited

U.S. PATENT DOCUMENTS 6,320,987 B1 *  11/2001  Chu .............................. 382/260
2004/0066981 A1    4/2004  Li
(Continued)

FOREIGN PATENT DOCUMENTS

GB          2373946       10/2002
JP          2009237927    10/2009
(Continued)

OTHER PUBLICATIONS

Search Rept: Jan. 31, 2012.
(Continued)

*Primary Examiner* — Antoinette Spinks
(74) *Attorney, Agent, or Firm* — Robert D. Shedd; Paul P. Kiel; Xiaoan Lu

(57) ABSTRACT

The invention relates to a method for processing video images comprising the steps for acquiring a plurality of video images during a time interval comprising a reference time t; associating a weighting factor with each of the video images, at least two of the video images having different weighting factors; memorising the video images; weighting each of the video images memorised with the associated weighting factor; generating an image called the reference image associated with the reference time t by averaging weighted video images. According to the invention, each video image is memorised with a resolution proportional to the weighting factor associated with said video image in order to reduce the memory space necessary for the storage of images and reduce the access time to the memorised images.

12 Claims, 2 Drawing Sheets

(51) Int. Cl.
*G06T 5/00* (2006.01)
*H04N 5/262* (2006.01)

(56) References Cited

U.S. PATENT DOCUMENTS

| | | |
|---|---|---|
| 2004/0075663 A1 | 4/2004 | Plante |
| 2005/0134591 A1 | 6/2005 | Baxter |
| 2005/0138569 A1 | 6/2005 | Baxter et al. |
| 2006/0153299 A1* | 7/2006 | Iwata et al. ............. 375/240.16 |
| 2008/0129873 A1 | 6/2008 | Nagano et al. |
| 2010/0026827 A1 | 2/2010 | Kobayashi |

FOREIGN PATENT DOCUMENTS

| | | |
|---|---|---|
| WO | WO2004090815 | 10/2004 |
| WO | WO2010072718 | 7/2010 |

OTHER PUBLICATIONS

Max Plotnikov, Efficient implementation of motion blur on particles, St Petersburg State Polytech University, Sixth International Workshop on Nondestructive Testing and Computer Simulations in Science and Engineering, pp. 279-281, Alexander I. Melker, Editor, Proceedings of SPIE vol. 5127 (2003).

* cited by examiner

METHOD AND DEVICE FOR GENERATING IMAGES COMPRISING MOTION BLUR

This application claims the benefit, under 35 U.S.C. § 365 of International Application PCT/EP2011/072328, filed Dec. 9, 2011, which was published in accordance with PCT Article 21(2) on Jun. 21, 2012 in English and which claims the benefit of French patent application No. 1060459 filed Dec. 14, 2010.

DOMAIN OF THE INVENTION

The present invention relates to a method and a device for video processing intended to generate images comprising motion blur. The invention relates more specifically to the domain of animation and video effects and can be applied to synthesis images or images generated by an image capture device equipped with a digital shutter.

The purpose of this processing is to render the images more natural and softer to the human eye.

TECHNOLOGICAL BACKGROUND

Motion blur is the visible blur that appears on an image or video sequence of a film or animation when it comprises an object in movement. This blur is due to a rapid displacement of the object during the capture of the image or to a long exposition duration (pose time) of the image capture device (camcorder or fixed camera). The captured image integrates all of the positions of the object over a period corresponding to the exposition duration determined by the shutter speed of the image capture device. In this image, an element of the captured scene that is in movement with respect to the capture device then appears blurred in the direction of the movement. This blurred element can be an object in movement of the scene when the image capture device is fixed, or the background of the scene when the image capture device moves at the same speed as the objects in movement of the scene.

In the case of synthesis images, each image can be assimilated with an image that will be captured by a capture device having an infinite shutter speed (exposition duration quasi-null). There is thus no motion blur and the displacement of objects in movement in the images appears discontinuous and juddered to the human eye.

As concerns the images generated by a capture device with a digital shutter (non-mechanical, the representation of the object in movement on the captured image can contain temporal artefacts that are disagreeable to the human eye due to the abrupt truncation of the light signal by the digital shutter that typically operates in start/stop mode, that is to say with only 2 possible states for the shutter.

To overcome this problem, it is known to those skilled in the art to apply to these images a processing simulating the filtering incurred by a mechanical shutter. For the images generated by a capture device with a digital shutter, this processing consists in according the temporal response of the digital shutter with that of a mechanical shutter. For synthesis images, the processing consists in filtering the image with a filter called a "motion filter", having a temporal response close to that of a mechanical shutter.

This processing generally consists in acquiring a plurality of video images over an interval of time centred on a reference time t relating to the image to be displayed, in weighting each of said video images and in implementing a display of the image associated with the reference time t by averaging weighted video images. The number of images to be weighted and the value of weighting factors to be considered for this processing depends on the temporal response to be reproduced.

This processing requires obtaining and saving, for each image to be displayed, several video images. Its implementation thus requires a large memory space to store these images and implicates relatively long memory access time, which has an influence on the processing time.

SUMMARY OF THE INVENTION

A purpose of the invention is to propose a method for image processing overcoming all or some of the disadvantages previously cited, and more specifically a method for image processing using a reduced memory space and requiring lower access times.

For this purpose, the present invention proposes a method of video processing comprising the following steps for:
  acquiring a plurality of video images during a time interval comprising a reference time t,
  associating a weighting factor with at least some of the video images, at least two of the video images having different weighting factors,
  memorising the video images,
  weighting each of the video images memorised with the associated weighting factor,
  generating an image called the reference image associated with the reference time t by averaging weighted video images, characterized in that each of the video images is memorised with a resolution proportional to the weighting factor associated with said video image, the weighting factor associated with each video image according to a decreasing function of the duration separating the video image from the reference time t.

Thus, according to the invention, the images for which the associated weighting factor is low have a low resolution. This enables the memory space occupied by these images to be reduced and the access time to these images to be reduced.

Thus, the video images temporally furthest from the reference time t have the lowest weighting factors. The application of low weighting factors to the video images furthest from the reference time enables the temporal response of a mechanical shutter to be reproduced and thus softer transitions between successive reference images to be obtained.

By resolution of an image is understood the number of points or pixels that it comprises, both horizontally and vertically. When the resolution of an image is reduced, the number of pixels is reduced.

According to a particular embodiment, the weighting factor associated with each video image is inversely proportional to the duration separating said video image from the reference time t.

According to a particular embodiment, the time interval is centred on the reference time t.

According to a particular embodiment, the weighting factor associated with each video image is inversely proportional to the raised cosine of the duration separating said video image from the reference time t.

According to a particular embodiment, each image of said plurality of video images is a multi-resolution image, such as for example an image in accordance with the standard JPEG 2000.

The invention also relates to a device for acquisition and processing of video images comprising:
  acquisition means for acquiring a plurality of video images during a time interval comprising a reference time t, a memory for memorising acquired video images, a processing circuit for associating a weighting factor with each of the video images, at least two of the video images having different weighting factors, in order weight each of the video images memorised with the associated weighting factor and to generate a image called the reference image associated with the reference time t by averaging of weighted video images, control means to control the memorisation of acquired video images in the memory, characterized in that each of the acquired video images is memorised in the memory with a resolution proportional to the weighting factor associated, the weighting factor associated with each video image according to a decreasing function of the duration separating the video image from the reference time t.

According to a particular embodiment, the time interval is centred on the reference time t.

Advantageously, the processing circuit associates with each video image a weighting factor that is inversely proportional to the duration separating said video image from the reference time t in order to reproduce the filtering performed by the mechanical shutter of a camera.

Preferably the processing circuit associates with each video image a weighting factor that is inversely proportional to the raised cosine of the duration separating said video image from the reference time t.

BRIEF DESCRIPTION OF THE FIGURES

The invention will be better understood, and other aims, details, characteristics and advantages will appear more clearly over the course of the detailed description which follows in referring to the figures in the appendix, showing in.

DETAILED DESCRIPTION OF AN EMBODIMENT

Figure 1:
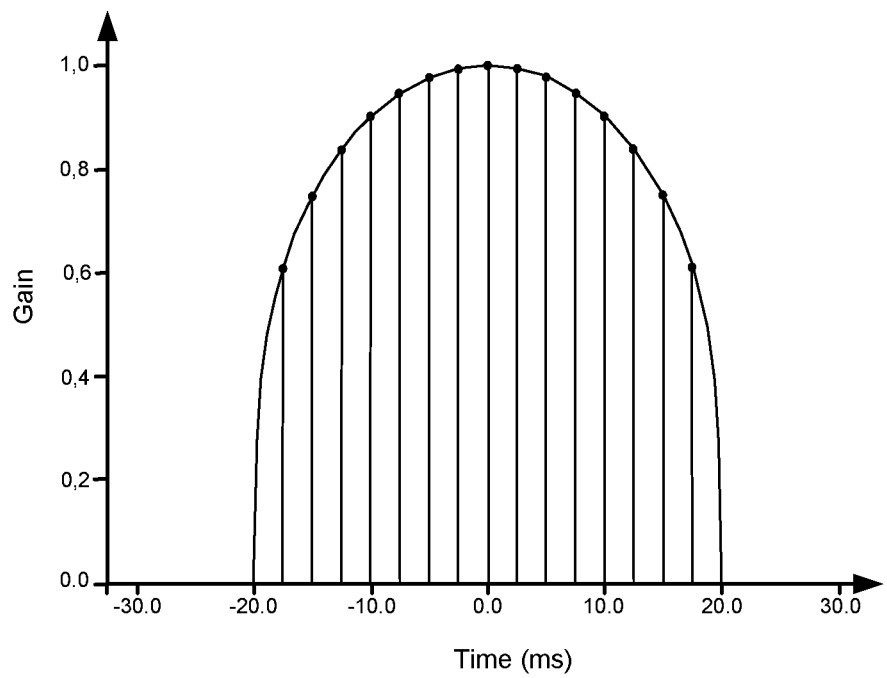
FIG. 1, a diagram showing the light integration function of a standard mechanical shutter, FIG. 2, a diagram showing an example of the light integration function of a digital shutter, FIG. 3, a schema showing a same image with several possible resolutions, and FIG. 4, a scheme of a device for implementing the method of the invention.

The present invention relates to the introduction of motion blur in synthesis images or digital images and proposes to optimize the memory space required for the implementation of this processing by reducing the resolution of images for which the weighting factor is low. This enables the size required for their storage to be reduced. In addition, the filtering applied to the image is determined in order to reproduce the filtering performed by a mechanical shutter.

Thus the role and operation of a shutter will first be described.

In the domain of digital and analogue camcorders, the lens of the camcorder is used to focus the light and direct it towards a chemical or semi-conductor image capture device. For example, in a digital camcorder, the image capture device is a CCD (Charge Coupled Device) captor or a CMOS (Complementary Metal Oxide Semiconductor) captor that measures the light with a matrix of thousands or millions of minuscule photo-sensitive diodes called photo-sensitive cells.

The quantity of light that reaches the captor must be controlled to avoid over-exposures and under-exposures. This is the role of the shutter. This can be either mechanical or digital.

By mechanical shutter is understood a component mounted in the capture device enabling the exposition duration of the image capture device to be adjusted. This shutter is for example an iris shutter or a curtain shutter.

Conversely, the digital shutter does not exist as a hardware component but represents the duration during which the photo-sensitive cells are authorised to receive light during a capture cycle.

In a general way, the shutter can be modelled via its temporal response, noted as h(t). The integration process of the light by a photo-sensitive cell can thus be shown by the following equation:

$$x_{shut}(t) = \int_{t-T}^{t} h(t-\tau) \cdot x(\tau) d\tau \qquad \text{(Equation 1)}$$

where
x(t) represents a signal of incident light,
$x_{shut}(t)$ represents the signal of light captured by the photo-sensitive cell,
T is the exposition duration of the photo-sensitive cell during which the cell is exposed to the incident light signal, T also corresponds to the duration of integration.

The shutter behaves like a filter only letting the light pass during a determined time corresponding to T, the quantity of light authorised to pass at each instant of this period being defined by the function h(t).

This filtering process where the integration of the light can be easily reproduced by applying equation 1 in discrete form to a set of video images contributes to the development of the image to be displayed. This integration then produces a weighted sum of video images, the weighting factors being determined by the temporal response h(t) of the shutter to be reproduced. Each of the video images contributing to the development of the image to be displayed is a video image respecting an instant specific to itself in a time interval centred on a reference instant t respecting the image to be displayed. These video images are for example images acquired with an acquisition frequency that is a multiple of the display frequency associated with the image to be displayed.

In the interests of clarity, the term sub-images will be used in the remainder of the description to designate video images contributing to the development of the image to be displayed.

Figure 2:
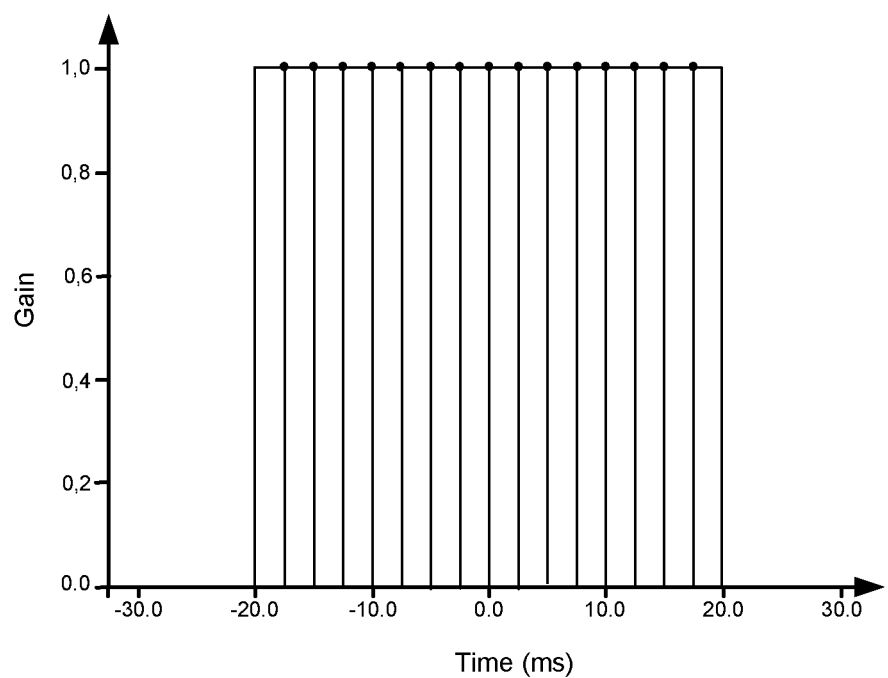

FIGS. 1 and 2 respectively show the temporal response of a mechanical shutter and the temporal response of a standard digital shutter. They are each shown in the form of a gain function, the gain being maximal and equal to 1 when the shutter is completely open and the gain being null when the shutter is closed.

The mechanical shutter opens and closes progressively. Consequently, its gain increases and diminishes progressively either side of its completely open position (FIG. 1).

The standard digital shutter behaves like a switch with two positions: one position open during which the photo-sensitive cells are authorised to capture light and a closed position during which the photo-sensitive cells are not authorised to capture light. The temporal response of this shutter is thus squared (FIG. 2).

These two responses can be modelled by a discrete raised cosine function, the roll-off factor being close to 0 for the digital shutter and positive for the mechanical shutter.

If the integration process of the light for a complete image is modelled in discrete form, it may be written in the following manner:

$$I_{shut}(x, y, k) = \frac{\sum_{q=k-Q}^{k} h\left(k - q - \frac{Q}{2}\right) \cdot I(x, y, q)}{\sum_{q=0}^{Q} h(k)} \quad \text{Equation 2}$$

where k is an index designating an image, q designates a sub-image among Q sub-images of the image k, Q is the total number of sub-images of the image k, I(x,y,q) represents the value of the pixel of coordinates (x,y) of the sub-image q, $I_{shut}$(x,y,k) represents the value of the pixel at coordinates (x,y) of the image k after processing, and h(q) is the discrete form of the temporal response of the shutter.

In order to introduce a motion blur into the image in accordance with that introduced via a mechanical shutter, a discrete temporal response h(t) will be used in equation 2 as shown in FIG. 1. As can be seen on this figure, some sub-images have a lower gain value than others. This gain value is representative of the weight of this sub-image in the image to be displayed. The weighting factor that will be applied to the sub-image is thus proportional to the gain shown in FIG. 1.

As can be seen on this figure (FIG. 1), some sub-images have thus a lower weight than others in the processing method. It is thus not necessary to store these sub-images with a heightened resolution.

Also, according to the invention, the resolution of sub-images can be adapted according to their weights (weighting factor). The resolution of each of the sub-images stored for processing is adapted proportionally to its weight (weighting factor). Thus, the sub-images of the image to be processed will occupy a memory space noticeably proportional to their weights. Only the sub-images having a factor equal to the maximal weighting factor will be saved with full resolution. This will thus enable memory space to be liberated and reduce access time to sub-images.

Figure 3:
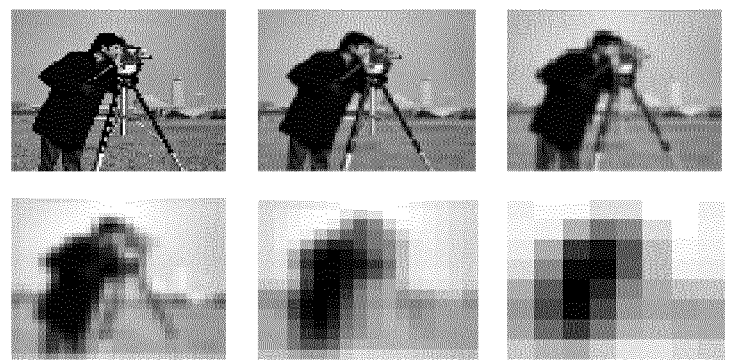

FIG. 3 illustrates this multi-resolution aspect of the method of the invention. This figure represents 6 sub-images representing the same scene but with different resolutions. The sub-image in the upper left corner of the figure shows a high resolution sub-image and that of the lower right corner shows a low resolution sub-image, the other sub-images having intermediary resolutions.

According to the invention, the sub-images having a maximal weighting factor will be stored in high resolution and those having a weighting factor will be stored with a resolution noticeably proportional to this weighting factor.

Advantageously, the method of the invention can be applied to the images in accordance with the standard JPEG 2000 and delivered by professional digital cameras equipped with a digital shutter. This image type in fact already comprises a multi-resolution hierarchical structure. The acquisition is carried out at a high frequency, for example 100 Hz or 200 Hz, by the camera. For each image to be displayed, it is possible to acquire several sub-images. For example in the case of a display at 25 Hz and an acquisition at 200 Hz, the camera generates 8 multi-resolution sub-images for each image to be displayed. For the processing, each sub-image will be stored with the resolution corresponding to the weighting factor to be associated with this sub-image.

Figure 4:
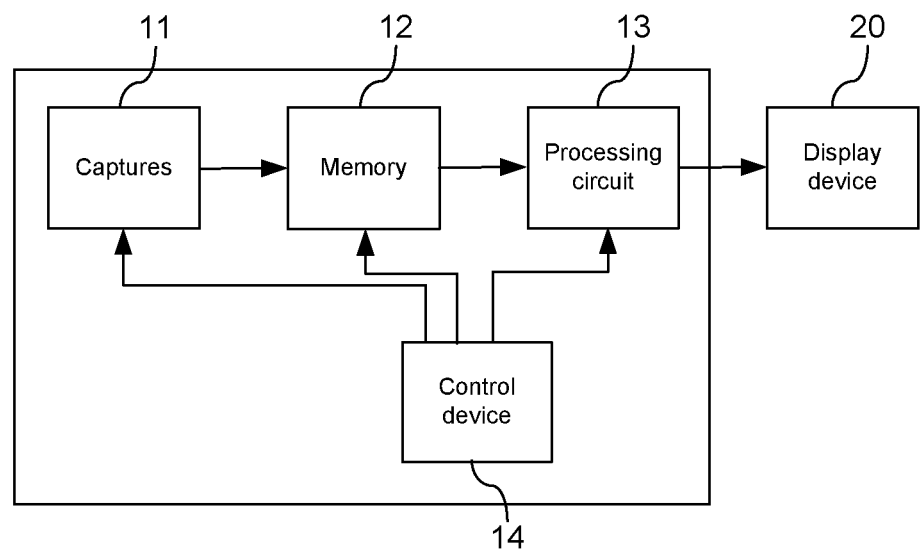

FIG. 4 shows the schema of a device able to implement the method of the invention. It comprises:

means for acquisition 11 of sub-images, such as for example CMOS capture devices for which the operating mode enables the obtaining of a high acquisition frequency, a memory 12 for memorising acquired sub-images, an image processing circuit 12 in order to associate a weighting factor with each video sub-image, to weigh each sub-image memorised with the associated weighting factor and to generate an image called the reference image associated with the reference time t by averaging of weighted video images, and means of control 14 for the set of means of the device.

The control means control more specifically the memory for each of the sub-images generated by the acquisition means stored in the memory with a resolution proportional to the associated weighting factor.

In order to reproduce the motion blur introduced by a digital shutter, the processing circuit advantageously associates with each video image a weighting factor that is inversely proportional to the duration separating said video image from the reference time t, that is to say a weighting factor that follows a decreasing function of the duration separating said video image from the reference time t as appears clearly with respect to FIG. 1. This weighting factor is preferably inversely proportional to the raised cosine of the duration separating said video image from the reference time t.

The reference image generated by the processing circuit is then transmitted to a display device 20.

This device is for example a camcorder having a very high acquisition frequency, for example 100 or 200 Hz, and delivering reference images at 25 Hz.

Though the invention has been described in relation to a specific embodiment, it is evident that this is in no way restricted and that it comprises all technical equivalents of the means described as well as their combinations if these enter into the scope of the invention.

According to a variant, a weighting factor is associated with each sub-image of some of the sub-images, that is to say to some only of the video images contributing to the development of the image to be displayed. For example, some sub-images close to the reference time t apply a coefficient equal to 1, which is to say that no weighting coefficient is associated with them.

According to another variant, the time interval during which the sub-images are captured is not centred on t. According to this variant, the reference time is positioned indifferently at the start or end of the time interval. According to this variant, the number of sub-images captured before the reference time t is not equal to the number of sub-images captured after the reference time t. Creating imbalance between the number of sub-images captured after the reference time t enables more importance to be given to the period running before the reference time t in the time interval (case corresponding to the situation where the number of sub-images captured before t is greater than the number of sub-images captured after t, which corresponds to the situation where t is situated temporally after the centre of the time interval) or to give more importance to the period running after the reference time t in the time interval (case corresponding to the situation where the number of sub images captured before t is less than the number of sub-images captured after t, which corresponds to the situation where t is situated temporally before the centre of the time interval). According to a particular embodiment, the reference instant t is placed at the start of the time interval (all the sub-images are captured after t during the time interval). According to another embodiment, the reference instant t is placed at the end of the time interval (all the sub-images are captured before t during the time interval).

The invention claimed is:

1. A method for acquiring and processing video images during a reference time interval, comprising:
   storing the video images;
   associating a respective weighting factor with each said stored video image to obtain weighted video images such that at least two of said weighted video images have different weighting factors;
   adapting a resolution of each said weighted video image proportionally to said respective associated weighting factor; and,
   generating a reference video image associated with a reference time t comprised in said reference time interval by averaging the weighted video images,
   wherein each said respective weighting factor following a decreasing function of a time duration separating each of said video images from the reference time t.

2. The method according to claim 1, wherein said respective weighting factor associated with each of the video images is inversely proportional to the time duration separating each of said video images from the reference time t.

3. The method according to claim 1, wherein the time interval is centred on the reference time t.

4. The method according to claim 1, wherein said respective weighting factor associated with each of the video images is inversely proportional to a raised cosine of the time duration separating each of said video images from the reference time t.

5. A device for acquiring and processing video images during a reference time interval, comprising:
   a memory for said video images;
   an image processor associating a weighting factor with each said stored video image to obtain weighted video images in said memory such that at least two of said weighted video images have different weighting factors;
   adapting a resolution of each said weighted video image in said memory proportionally to a respective associated weighting factor; and generating a reference video image associated with a reference time t comprised in said reference time interval by averaging said weighted video images;
   and each said respective associated weighting factor following a decreasing function of a time duration separating each of said video images in said memory from the reference time t.

6. The device according to claim 5, wherein said respective weighting factor is inversely proportional to the time duration separating each of said video images in said memory from the reference time t.

7. The device according to claim 5, wherein the time interval is centred on the reference time t.

8. The device according to claim 5, wherein said respective weighting factor is inversely proportional to a raised cosine of the time duration separating each of said video images in said memory from the reference time t.

9. A device for acquiring and processing video images, comprising:
   an image capture unit configured to acquire the video images during a time interval comprising a reference time t;
   a storage configured to store the video images; and
   an image processor configured to associate a weighting factor with each of the stored video images, at least two of the video images having different weighting factors, in order to weight each of the stored video images with the associated weighting factor and in order to generate a reference image associated with the reference time t by averaging the weighted video images,
   said image processor being further configured to control the storing of the video images in the storage,
   wherein each of the video images is stored in the storage with a resolution proportional to the associated weighting factor, a respective weighting factor being associated with each of the video images according to a decreasing function of a duration separating each of said video images from the reference time t.

10. The device according to claim 9, wherein the image processor is further configured to associate with each of the video images a respective weighting factor that is inversely proportional to the duration separating each of said video images from the reference time t.

11. The device according to claim 9, wherein the time interval is centred on the reference time t.

12. The device according to claim 9, wherein the image processor is further configured to associate with each of the video images a respective weighting factor that is inversely proportional to a raised cosine of the duration separating each of said video images from the reference time t.

* * * * *